May 16, 1967  A. R. PEARLMAN  3,320,530
QUASI-LOGARITHMIC MULTIMETER FOR PROVIDING AN OUTPUT WHICH IS
A LINEAR FUNCTION OF THE LOGARITHMIC OF THE INPUT
Filed July 8, 1964  2 Sheets-Sheet 1

INVENTOR.
ALAN R. PEARLMAN
BY
Robert J. Schuller
ATTORNEY

May 16, 1967  A. R. PEARLMAN  3,320,530
QUASI-LOGARITHMIC MULTIMETER FOR PROVIDING AN OUTPUT WHICH IS
A LINEAR FUNCTION OF THE LOGARITHMIC OF THE INPUT
Filed July 8, 1964  2 Sheets-Sheet 2

INVENTOR.
ALAN R. PEARLMAN
BY
Robert J. Schuller
ATTORNEY

United States Patent Office 3,320,530
Patented May 16, 1967

3,320,530
QUASI-LOGARITHMIC MULTIMETER FOR PROVIDING AN OUTPUT WHICH IS A LINEAR FUNCTION OF THE LOGARITHMIC OF THE INPUT
Alan R. Pearlman, Newton Highlands, Mass., assignor to Nexus Research Laboratory, Inc., Canton, Mass., a corporation of Massachusetts
Filed July 8, 1964, Ser. No. 381,160
8 Claims. (Cl. 324—62)

This invention relates to electrical measuring devices and more particularly to an improved multimeter.

A typical conventional ohmmeter basically comprises a meter, such as the usual D'Arsonval galvanometer, having a coil which exhibits, responsively to a current therethrough, an excursion which is substantially linearly related to the magnitude of the current. Also included is a source, such as a battery, of a standard, substantially steady-state voltage $E_s$, and an internal standard resistance $R_s$. When an unknown resistance $R_x$ is placed in series with the standard resistance to complete a circuit between the battery and meter movement, the value of $R_x$ can be readily determined. Usually, the values of $R_s$, $E_s$ and the meter constants are selected such that the full scale deflection of the meter occurs when $R_x=0$. The scale of the meter is then calculated according to the following:

$$I = \frac{E_s}{R_x + R_s}$$

It is apparent in such case that the division of the scale is non-linear with respect to $R_x$, and severe crowding then occurs at one end of the scale. Generally, the scale division will be at least approximately logarithmic, actually quasi-hyperbolic, and the greater portion (i.e., about 90% or more) of the scale is occupied by only one of two decades of values. If one desires to determine values lying in adjoining decades at either end of the scale (i.e., to measure a wider dynamic range of values of $R_x$, the meter is usually provided with range switching in the form of means for varying the values of $R_s$, $E_s$ and the meter constants, alone or in combination.

One important object of the present invention is to provide an improved volt-ampere-ohmmeter (herein referred to as a multimeter) which includes an element exhibiting an excursion or displacement responsively to an input signal, and means for controlling the element such that the displacement embraces a wide dynamic range of values with respect to an unknown resistance, voltage or current upon which the input signal is at least in part based.

Other important objects of the present invention are to provide such a multimeter wherein said wide dynamic range is displayed on a scale divided into a multiplicity of approximately logarithmic decades; to provide a multimeter of the type described which possesses substantially constant relative accuracy of measurement across the entire range of said multiplicity of decades; and to provide such a multimeter which includes both zero and open-circuit readings in conjunction with the approximate logarithmic decades on its scale.

Yet another object of the present invention is to provide a multimeter which includes read-out means having an element exhibiting a displacement linearly related to an input voltage thereto and having a scale associated with said displacement and divided into a multiplicity of logarithmic decades, a lorgarithmic ratiometric circuit for establishing the voltage to which said element is responsive, the magnitude of said voltage being substantially equal to the logarithm of a function of a ratio involving the magnitudes of a reference voltage, a standard resistance and an unknown electrical value sought to be measured.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
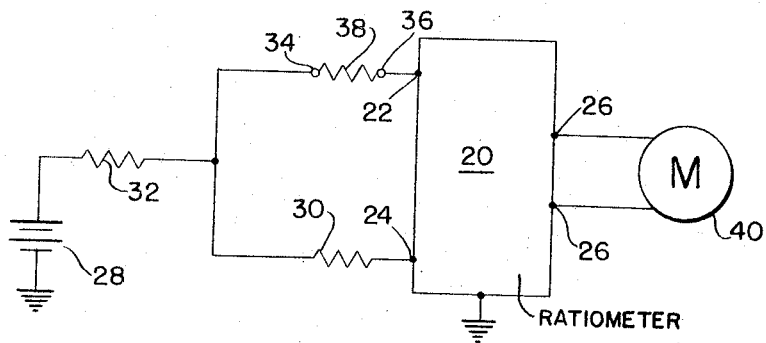
FIG. 1 is a schematic circuit diagram, partly in block form, of a simple embodiment of the principles of the present invention.

Generally, the present invention comprehends, in its simpler form, an ohmmeter which can be readily modified to provide a more complex multimeter as hereinafter described. As shown in FIGURE 1, the invention includes logarithmic ratiometer 20 having a pair of input terminal means 22 and 24, and output terminal means 26. Ratiometer 20 is characterized in providing at output terminal means 26 a voltage output which is determined according to the logarithm of the ratio of two distinct input currents applied respectively to input terminals means 22 and 24.

As means for providing a current to terminal means 24, the invention includes a source, such as battery 28, of a reference voltage, and resistor 30 connected between one terminal of battery 28 and terminal means 24. The other terminal of battery 28 is connected to ground. The preferred form of the invention also includes a current limiting means, such as resistor 32 connected in series between the one terminal of battery 28 and resistor 30.

The embodiment of FIGURE 1 includes means, such as terminals 34 and 36, across which it is intended to connect resistor 38 of the unknown magnitude intended to be measured, terminal 36 being directly connected to terminal means 22 and terminal 34 being connected through current limiting resistor 32 to the one terminal of battery 38. Thus, when resistor 38 is properly connected for measurement, the current to terminal means 24 is uniquely determined by the magnitudes of the voltage of battery 28 and the resistance of resistor 30; the concurrent input current to terminal means 22 is also uniquely determined by the identical voltage magnitude and the unknown resistance value of resistor 38. The output voltage at terminal means 26 is substantially equal to the logarithm of a function of the ratio of these two input currents, and is displayed upon a read-out device, such as meter 40. One important advantage of this embodiment is that it is not necessary to have precise reference voltage, since the input current ratio is independent of variations in a voltage which is common to both inputs of the ratiometer circuit. Read-out device 40 typically can be a D'Arsonval type galvanometer, a cathode ray tube display device, or a number of other known instruments having an element exhibiting an excursion or displacement which is linearly related to the amplitude of an input voltage thereto.

Logarithmic ratiometer 20 is preferably in the form of a circuit which employs the log-linear relationship of an output current with respect to the voltage across the diode junction of semiconductor device (for example, a planar silicon transistor) to provide a log-linear relationship having an improved thermal stability and substantially constant accuracy over a large range of inputs to the circuit. In the preferred ratiometer, a pair of operational amplifiers, well known in the art, are employed to sense the forward voltage drops across a corresponding pair of respective diode junctions and also to provide isolation between input and output signal paths. This structure tends also to minimize the input impedance seen by the signals, and provides power amplification to drive subsequent circuitry thus permitting measurement of voltage signals of small magnitude with respect to the aforesaid voltage drops, and of current signals small with respect to the drive requirements of the subsequent circuitry.

Figure 3:
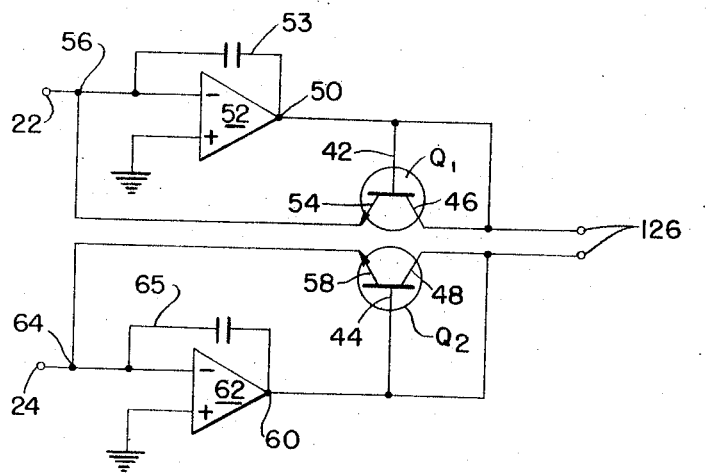
FIG. 3 is a schematic circuit diagram, partly in block, of another form of a logarithmic ratiometer provided as element in the embodiments of FIGURE 1 and FIGURE 2.

One form of such ratiometer is shown in FIGURE 3 and comprises a pair of diode-junction-containing devices, such as silicon planar transistors $Q_1$ and $Q_2$, which are preferably matched as hereinafter described to show substantially the same junction characteristics i.e., $V_{EB}$ and $I_E$, with respect to one another over a given temperature range, for example from 10° C. to 80° C. In order to insure that the transistors will be exposed substantially simultaneously to the same ambient temperature so that the characteristics of each optimally track one another with ambient temperature changes, it is preferred that they are potted quite closely to one another, as by having their cases in contact in a known, highly thermally conductive plastic, or by mounting on a common heat-sink. The two transistors $Q_1$ and $Q_2$ are arranged so that their respective bases 42 and 44 are tied in direct short circuit to their respective collectors 46 and 48. This configuration is advantageous in that a separate collector bias supply is not required. Because, in effect, the transistors act simply as diodes, it is possible to replace $Q_1$ and $Q_2$ with appropriately poled diodes. However, within the present state of the art, transistors in the configuration shown in FIGURE 3, for the purposes of the ratiometer preferred for use in the present invention, are superior in most respects to present diodes, although operating as such.

Base 42 of transistor $Q_1$ is coupled directly to output terminal 50 of operational amplifier 52. The latter preferably has a negative feedback loop 53 having a small series capacitive impedance therein connecting its output to its input, all in order to compensate for capacitance between the input summing junction of the amplifier and ground, thus reducing high frequency noise. Emitter 54 of transistor $Q_1$ is connected to summing junction 56 at the input of amplifier 52, the summing junction also being connected directly to current input terminal means 22. It will be apparent that the dynamic resistance across the base-emitter junction of transistor $Q_1$ provides the resistance in a negative feedback loop around amplifier 52.

In like manner, base 44 and emitter 58 of transistor $Q_2$ are respectively coupled to output terminal 60 and input summing junction 64 of operational amplifier 62. Operational amplifier 62 preferably also includes a small capacitive-impedance, negative feedback loop 65. Summing junction 64 is directly connected to current input terminal 24.

In operation, assuming current input $I_1$ and $I_2$ applied concurrently and respectively to input terminal means 22 and 24, the base-emitter voltages for transistor $Q_1$ and $Q_2$ can be shown respectively to be (1) $$V_{BE3} = V_{01} + a_1 \log \frac{I_{E1}}{I_{01}} + b_1(T_j - T_o)$$

and (2) $$V_{BE2} = V_{02} + a_2 \log \frac{I_{E2}}{I_{02}} + b_2(T_j - T_o)$$

where for the respectively numbered transistor, $V_{BE}$ is the base-emitter voltage of a specific transistor, $V_0 = V_{BE}$ measured at a given reference current $I_0$ and reference temperature $T_o$, $I_E$ = the actual emitter current
$T_j$ = the actual junction temperature
$a$ = a logarithmic coefficient; and
$b$ = a temperature coefficient In practise for silicon transistors, typically $a \approx 60$ mv./decade and $b \approx 2$ mv./° C. around room temperature. The relationship expressed in these equations is restricted to values of $I_E$ appreciably larger than the junction saturation current $I_s$; however, for well-made planar silicon transistors, $I_s$ is very nearly the same as the base-emitter leakage current, $I_{EBO}$.

Since we can define $a_2 = a_1$ $$a_2 = a_1 \left[ 1 + \frac{(a_2 - a_1)}{a_1} \right]$$

and $(V_{BE2}) - (V_{BE1}) = \Delta E$, one finds, upon subtracting Equation 1 from Equation 2 that (3)
$$E = V_{02} - V_{01} + a_1 \log \frac{I_{01}}{I_{02}} + a_1 \log \frac{I_{E2}}{I_{E1}} +$$
$$(a_2 - a_1) \log \frac{I_{E2}}{I_{02}} + (b_2 - b_1)(T_j - T_0)$$

A single substantially constant voltage term $V_D$ can be substituted in the above, by defining as follows:

$$V_D = V_{02} - V_{01} + a_1 \log \frac{I_{01}}{I_{02}}$$

Thus:

(4)
$$\Delta E = V_D + a_1 \log \frac{I_{E2}}{I_{E1}} + (a_2 - a_1) \log \frac{I_{E2}}{I_{03}} + (b_2 - b_1)(T_j - T_0)$$

Within the state of the art, transistors can be easily matched such that $$\frac{a_2 - a_1}{a_{av.}} \approx 0.01, \text{ where } a_{av.} = \frac{a_2 + a_1}{2}$$

and $$\frac{b_2 - b_1}{a_{av.}} \approx 0.0002 \text{ of a decade/° C.}$$

These criteria for selection presuppose constancy for $a_1$ and $a_2$. In fact, these latter coefficients are thermally variable and roughly can be considered constant only within an error of about 10% over a range of approximately 30° C. around room temperature. However, with respect to the coefficients $(a_2 - a_1)$ and $(b_2 - b_1)$ of Equation 4 the assumption of constancy is quite valid as a good approximation in that logarithmic conformity can thus be achieved within 1% or less per decade, and thermal drift from operating point becomes a second-order error which can be neglected. Thus, Equation 4 can be further simplified as follows:

(5) $$\Delta E = V_D + a_1 \log \frac{I_{E2}}{I_{E1}}$$

It will be appreciated that $\Delta E$ or $E_o$ is the potential appearing from base to base of transistors $Q_1$ and $Q_2$ and which will cause an element, such as a known coil, in meter 40 to deflect proportionately. Because an operational amplifier characteristically tends toward establishing a virtual ground at its input summing junction, at equilibrium, $I_{E1}=f(I_1)$ and $I_{E2}=f(I_2)$. Thus the meter will display a function of log $$\frac{I_2}{I_1}$$

Since $$\frac{I_2}{I_1} = \frac{E_s/R_2}{E_s/R_1} = \frac{R_2}{R_1}$$

and if $R_2$ is unknown resistor 38, then $R_1$ must be standard resistor 30 and the meter can be calibrated as displaying $$\log \frac{R_2}{R_1} \text{ or } \log \frac{R_2}{K}$$

The meter can thus be divided into a multiplicity of substantially logarithmic decades.

Figure 2:
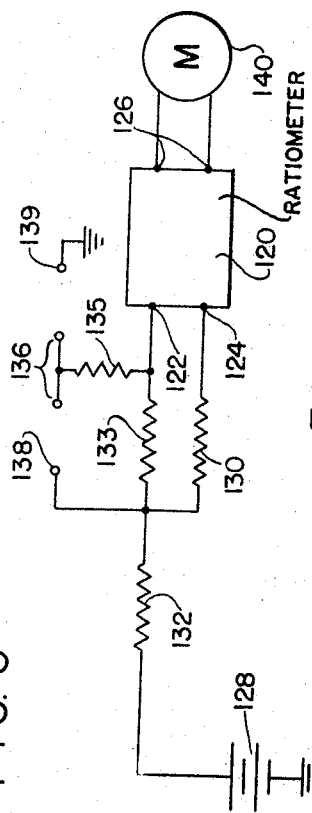
FIG. 2 is a schematic circuit diagram, partly in block form, of yet another embodiment of the present invention.

The principles of the present invention can advantageously be employed to provide a multimeter such as is shown in FIG. 2. In the embodiment of FIG. 2, there is included logarithmic ratiometer 120 having input terminal means 122 and 124 and output terminal means 126 connected to read-out device or meter 140. As before, the device includes a source, or battery 128, a reference voltage which in this instance is preferably a standard substantially steady-state voltage $E_s$, battery 128 having one pole connected through series current limiting resistor 132 and first standard resistor 130 to terminal means 124. The other pole of battery 128 is grounded.

Input terminal means 122 however is also connected to the one pole of battery 128 through a second standard resistor 133 in series with current limiting resistor 132. Second resistor 133 is preferably of substantially the same magnitude of resistance as first resistor 130. Third standard resistor 135 is connected between terminal means 122 and test terminal 136. The embodiment of FIG. 2 also includes a pair of terminals 138 and 139, the latter being connected to ground and the other being connected to a point in the circuit between resistors 132 and 133. Terminals 136 and 138 serve to provide points across which the unknown value of a resistance can be measured; similarly, terminals 138 and 139 serve as points across which an unknown voltage can be applied for measurement.

Assuming that a resistor of unknown value $R_x$ is connected across the terminals 138 and 136, the operation of the embodiment of FIG. 2 is as follows:

Ratiometer 120 provides an output voltage $E_o$ to meter 140 such that (6)
$$E_o = \log \frac{I_x}{I_p}$$

where $I_x$ is the current input at terminal means 122 and
$I_p$ is the current input at terminal means 124.

Ignoring the effect of resistor 132 because it is the same with respect to each of $I_x$, $I_p$ is uniquely determined by the voltage $E_x$ of battery 128 and the value $R_p$ of resistor 130 i.e., $E_x/R_p$.

Similarly, remembering that the value of resistor 133 is also $R_p$, and assuming a value of $R_s$ for resistor 135, it can be shown that (7)
$$I_x = E_x / \frac{R_p(R_x + R_s)}{R_p + R_x + R_s}$$

then, $$\frac{I_x}{I_p} = K_1 \left[ 1 + \frac{R_p}{R_s + R_x} \right] \text{ or}$$

or (8)
$$E_o = K \log \left( 1 + \frac{R_p}{R_s + R_x} \right)$$

Figure 4:
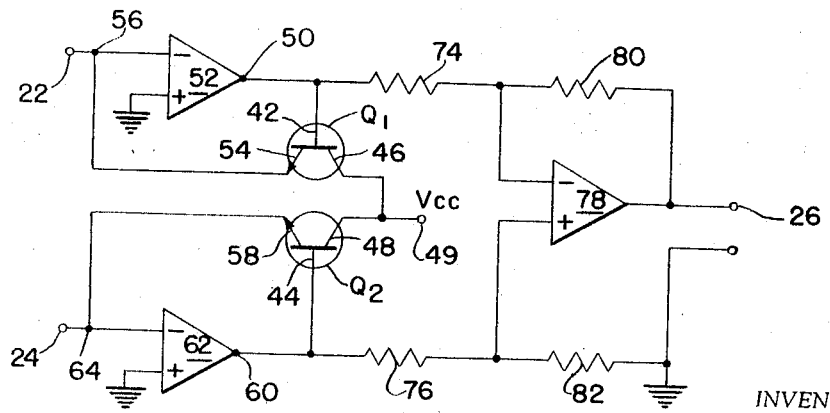
FIG. 4 is a schematic diagram, partly in block, of yet another form of a logarithmic ratiometer provided as an element in the embodiments of FIGURE 1 and FIGURE 2.

An alternative form of ratiometer particularly useful in the embodiment of the invention shown in FIGURE 2 is illustrated in FIGURE 4. The invention as shown in FIGURE 4 comprises the pair of diode-junction-containing devices transistors $Q_1$ and $Q_2$ matched as hereinbefore described, and disposed closely to one another to insure that they share substantially the same thermal environment. Collectors 46 and 48 of transistors $Q_1$ and $Q_2$ respectively are connected to one another at terminal 49. Bases 42 and 44 of transistors $Q_1$ and $Q_2$ are respectively coupled directly to output terminals 50 and 60 of corresponding operational amplifiers 52 and 62. Emitter 54 of transistor $Q_1$ is connected to summing junction 56 at the input of amplifier 52; emitter 58 is likewise connected to summing junction 64 at the input of amplifier 62. Thus, as in the embodiment of FIGURE 3, the dynamic resistance across the base-emitter junction of each transistor provides the resistive component in a negative feedback loop around its associated operational amplifier. The bases of transistors $Q_1$ and $Q_2$ are respectively also connected through resistors 74 and 76 to respective inputs of a two-input operation amplifier 78, which has a negative feedback loop from its output to one of its input terminals, which feedback loop includes resistive impedance 80. The other of the input terminals to amplifier 78 is connected to ground through another resistance 82. The output of amplifier 78 is connected to output terminal means 26.

In operation, terminal 49 is connected to a source of potential $V_{cc}$ for viasing the collectors of the transistors at a substantially constant value which is preferably equal to or greater than the maximum expected base-emitter voltages. Assuming current inputs $I_1$ and $I_2$ applied concurrently and respectively to input terminals 22 and 24, operation of the embodiment of FIGURE 4 will be substantially the same as that of FIGURE 3. However, it will be appreciated that $\Delta E$ of Equation 5, by virtue of resistors 74, 76, 80, and 82 (all preferably matched in value) drives a differential input signal to amplifier 78. The latter, operating as a subtractor, will provide a single-ended output $E_o$ at terminal 26 referred to ground. The temperature dependence of $a_1$, in this case, introduces a thermal error into only the slope of the response, which can be compensated for in the measuring device used to determine the value of the potential at the output or amplifier 78.

Because meter 140 will display $E_o$ it will be apparent that when $R_x = O$, $E_o$ as provided by the embodiment of FIG. 2 will still have a finite value; thus $R_s$ provides the zero $R_x$ value for a scale upon which the position of the deflectable element or needle of meter 140 is to be indicated. In like manner, it will be seen that $R_p$ substantially provides the value for an "infinite" $R_x$ point on a scale.

Where the movement of meter 140 is linear (i.e., throughout substantially all of its excursion will deflect in linear relation to the input current through the meter coil) then because of the relation provided by the logarithmic ratiometer 120, the meter scale will require division into a number of angular increments matched in size within an order of magnitude, each of which in turn is divided to provide a nearly logarithmic decade, except for the decade near zero volts where the scale is nearly linear.

Figure 5:
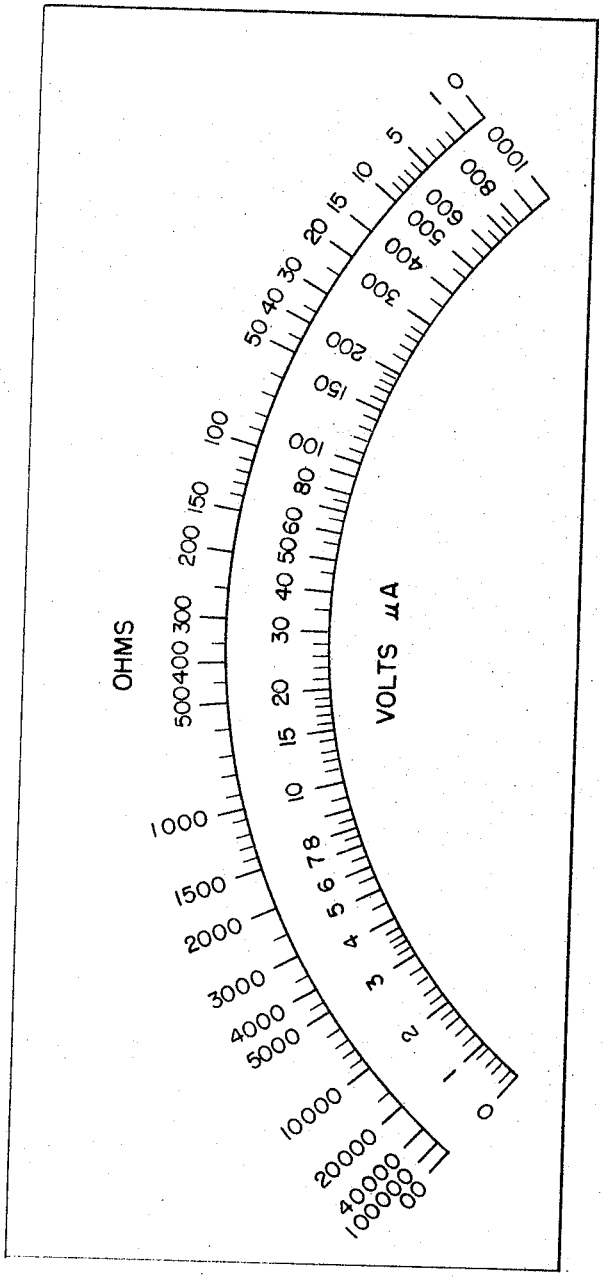
FIG. 5 is an exemplary meter face including an ohm scale and a volt-microampere scale particularly adapted for use with the embodiment of FIGURE 2.

As shown in particular in FIGURE 5, a typical scale of meter 140 used as an ohmmeter is divided throughout its predetermined angular range between terminal positions respectively representing a 0 and "infinite" value for $R_x$ as hereinbefore explained, into a multiplicity of nearly logarithmic decades. The upper scale shown in FIGURE 5 and marked "ohms" provides an improved dynamic range in containing five such decades which cover substantially the entire scale range, although other numbers of decades are equally feasible. Not only is a substantially logarithmic scale thus provided with "zero" and "infinite" resistance readings, but the improved dynamic range is one in which, because of the use of the logarithmic ratiometer, the relative accuracy of measurement across each decade remains substantially constant regardless of the size of the measurement. Because the angular width of each decade is not necessarily equal to that of adjoining decades but certainly within the same order of magnitude, and because of the presence of zero and infinite indicia, the read-out should be termed quasi-logarithmic.

Where the embodiment of FIGURE 2 is to be employed as a voltmeter for example, the unknown voltage is simply applied across terminals 136 and 139. The current to terminal means 124 is known and uniquely determined as hereinbefore described, but in this instance the current to terminal 122 is the sum of the currents respectively then flowing in resistor 133 due to the voltage $E_s$ and in resistor 135 due to the unknown voltage $E_x$. The voltage display on meter 140 on a "volt" scale adjacent the "ohm" scale shown in FIGURE 5, will include a zero position on the same radius as the "infinite" position of the ohms scale. Similarly, the maximum voltage at terminals 126 will be indicated at a position corresponding to the zero reading for the ohms scale. Again, due to the nature of the logarithmic ratiometer the volt scale will be divided into a plurality of approximately logarithmic decades, the number of decades depending upon the values selected for $R_s$ and $R_p$. Thus, as shown, in the example, the volt scale is divided into four such decades, and this can be accomplished by setting the ratio of $R_p$ to $R_s$ as 10,000 to 1. The voltage in this instance across terminals 126 is from Equation 8 simplified then in the form of log $(1+Ke_x)$.

Since certain changes may be made in the above apparatus without departing form the scope of the invention herein involved it is intended that all matter contained in the above description or shown in the accompanying drawing shall be interpreted in an illustrative and not in a limiting sense.

What is claimed:

1. An ohmmeter comprising, in combination:
a two-input-terminal logarithmic ratiometeric device for providing an output voltage which is a linear function of the logarithm of the ratio of currents applied respectively at said input terminals;
a source of standard substantially steady-state voltage having an output terminal of a predetermined polarity;
a first standard resistance connected between said output terminal of said source and one of said input terminals so that the input current to said one input terminal is determined only by said steady-state voltage and the value of said resistance;
a second standard resistance connected between said output termined of said source and the other of said input terminals;
a third standard resistance;
means for shunting said second resistance with a series combination of said third resistance and a resistance of unknown value sought to be measured; and
means responsive to said output voltage for indicating said linear function.

2. A voltmeter comprising, in combination:
a two-input-terminal logarithmic ratiometric device for providing an output voltage which is a linear function of the logarithm of the ratio of currents applied respectively at said input terminals;
a source of standard substantially steady-state voltage having an output terminal of a predetermined polarity;
a first standard resistance connected between said output terminal of said source and one of said input terminals so that the input current to said one input terminal is determined only by said steady-state voltage and the value of said resistance;
a second standard resistance connected between said output terminal of said source and the other of said input terminals;
a third standard resistance;
means connecting said third resistance in series between said other input terminal and a source of unknown substantially steady-state voltage sought to be measured; and
means responsive to said output voltage for indicating said function.

3. A multimeter comprising, in combination:
a two-input-terminal logarithmic ratiometric device for providing an output voltage which is a linear function of the logarithm of the ratio of the currents applied respectively at said terminals;
a source of standard voltage having an output terminal of a predetermined polarity;
a first standard resistance connected between said output terminal of said source and one of said input terminals so that the input current to said one input terminal is determined only by steady-state voltage and the value of said resistance;
a second standard resistance connected between said output terminal of said source and the other of said input terminals;
a third standard two-ended resistance connected at one end thereof to said other input terminal;
means for connecting the other end of said third resistance to only one of (a) an unknown resistance so as to form a series combination in shunt of said second resistance and (b) a source of unknown voltage; and
means responsive to said output signal for indicating said linear function.

4. A voltmeter comprising, in combination:
a two-input-terminal device for producing an output voltage which is variable according to the logarithm of the ratio of concurrent input currents applied at each said terminal;
first and second known standard resistances of substantially equal value respectively connected between an output terminal of a standard source of substantially steady-state voltage and each said input terminal so as uniquely to determine the input current to one of said input terminals;
a third known standard resistance connected between the other of said input terminals and a source of voltage $E_x$ of unknown magnitude so as to provide a current which together with a current due to application of said steady-state voltage to the standard resistance connected to said other input terminal uniquely determines the input current to said other input terminal; and
means responsive to said output voltage for indicating said output voltage in the form of log $(1+Ke_x)$ where K is a predetermined constant.

5. An ohmmeter for measuring the value of an unknown resistance $R_x$, and comprising, in combination:
a two input terminal ratiometric device for providing an output signal which is substantially a linear function of the logarithm of the ratio of signals applied respectively at said input terminals;
a first known standard resistance $R_p$ in series with one of said input terminals;
a second known standard resistance $R_s$;
a third known standard resistance having a value substantially equal to $R_p$;
means for connecting said unknown resistance and said second resistance in series with one another and in parallel with said third resistance;
a source of test voltage having a terminal of predetermined polarity connected through said first resistance to said one input terminal and through said third resistance to said other input terminal; and
means responsive to said output voltage for indicating an output signal in the form log $$\frac{(1+R_p)}{R_s+R_x}$$

6. An ohmmeter as defined in claim 5 wherein said means responsive to said output voltage has an element deflectable substantially linearly with respect to said output voltage and includes a scale for determining the magnitude of the deflection of said element, said scale having terminal deflection positions representing respective values of said unknown resistance of zero and substantially infinite, the greater portion of said scale between said positions being divided into a multiplicity of successive approximately logarithmic decades having angular sizes substantially of the same order of magnitude.

7. A multimeter comprising, in combination:
a logarithmic ratiometer comprising first and second operational amplifiers each having a respective electrical signal input terminal and a signal output terminal;
first and second semiconductor elements each having an input and output terminal and each having a diode junction between the latter terminals such that voltage across said junction is substantially linear with respect to the logarithm of a forward input current applied to its input terminal, said elements being disposed adjacent one another so as to be subject to substantially the same ambient temperature;
means connecting the junction of each of said first and second elements respectively in series in a corresponding negative feedback loop between the output and input signal terminals of the respective first and second amplifiers;
a source of steady-state test voltage having a terminal of predetermined polarity;
a standard resistance connected between said source and one of said electrical signal input terminals, so that the input current to said one electrical signal input terminal is determined by said steady-state voltage and the value of said standard resistance;
means for providing an input current to the other of said electrical signal input terminals, which input current is selected from one of the following: an unknown current, a current due to application of said test voltage to an unknown resistance, and a current due to application of an unknown voltage to said standard resistance; and
means for providing a substantially linear indication of the voltage across said signal output terminals.

8. A multimeter comprising, in combination:
a logarithmic ratiometer comprising first and second operational amplifiers each having a respective signal input terminal and a signal output terminal;
first and second semiconductor elements, each having an input and output terminal and each having a diode junction between the latter terminals such that voltage across said junction is substantially linear with respect to the logarithm of a forward input current applied to its input terminal, said elements being disposed adjacent one another so as to be subject to substantially the same ambient temperature;
means connecting the junction of each of said first and second elements respectively in series in a corresponding negative feedback loop between the output and input signal terminals of the respective first and second amplifiers; and
a third operational amplifier having an output terminal and a pair of inputs, one of which includes a summing junction connected through a first impedance to the output terminal of said first amplifier and connected to the output terminal of said third amplifier by a resistive negative feedback loop, the other of said inputs of said third amplifier being connected through a second impedance to the output terminal of said second amplifier and connected through a third impedance to ground for said ratiometer;
a source of steady-state test voltage connected between said ground and a terminal of predetermined polarity;
a standard resistance connected between said terminal of said source and one of said signal input terminals so that the input current to said one signal input terminal is determined only by said steady-state voltage and the value of said resistance;
means for providing an input current to the other of said electrical signal input terminals, which input current is selected from one of the following: an unknown current, a current due to application of said test voltage to an unknown resistance, and a current due to application of an unknown voltage to said standard resistance; and
means for providing a substantially linear indication of the voltage between said ground and the output of said third amplifier.

References Cited by the Examiner

UNITED STATES PATENTS

| | | | |
|---|---|---|---|
| 2,244,369 | 6/1941 | Martin | 324—119 X |
| 2,576,249 | 11/1951 | Barney | 324—57 |
| 2,763,838 | 9/1956 | McConnell | 324—140 |
| 2,769,098 | 10/1956 | Dunham. | |
| 2,916,702 | 12/1959 | Bigelow | 324—111 |
| 3,034,044 | 5/1962 | Konegsberg | 324—57 |
| 3,092,779 | 5/1963 | De Niet | 328—145 |
| 3,217,247 | 11/1965 | Taber | 324—57 |

OTHER REFERENCES

Greenwood et al.: Electronic Instruments, "Exponentials and Logarithms," McGraw-Hill Co., 1948, pp. 122–126.

Hariharan et al.: Journal of Scientfic Instruments, "A Logarithmic Megohmmeter," vol. 33, April 1956, pp. 158–159.

Howard et al.: Electronics, "Linear to Logarithmic Voltage Converter," July 1953, pp. 156–157.

Hunt et al.: Review of Scientific Instruments, "A Vacuum-Tube Voltmeter With Logarithmic Response," vol. 4, December 1933, pp. 672–675.

WALTER L. CARLSON, *Primary Examiner.*

E. E. KUBASIEWICZ, *Assistant Examiner.*